United States Patent
Chawla et al.

(10) Patent No.: US 12,548,313 B2
(45) Date of Patent: Feb. 10, 2026

(54) BOOSTING GRAPH EXPLAINABILITY USING SELF-GUIDED DATA AUGMENTATION

(71) Applicant: Robert Bosch GmbH, Stuttgart (DE)

(72) Inventors: Piyush Chawla, Columbus, OH (US); Liang Gou, San Jose, CA (US); Huan Song, San Jose, CA (US); Thang Doan, Santa Clara, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 18/177,163

(22) Filed: Mar. 2, 2023

(65) Prior Publication Data
US 2024/0296667 A1  Sep. 5, 2024

(51) Int. Cl.
*G06V 10/82* (2022.01)
*G06V 10/74* (2022.01)
*G06V 10/84* (2022.01)

(52) U.S. Cl.
CPC ........... *G06V 10/82* (2022.01); *G06V 10/761* (2022.01); *G06V 10/84* (2022.01)

(58) Field of Classification Search
None
See application file for complete search history.

(56) References Cited

U.S. PATENT DOCUMENTS

| | | | | |
|---|---|---|---|---|
| 2019/0138973 | A1* | 5/2019 | Akella | G06F 30/20 |
| 2020/0334495 | A1* | 10/2020 | Al-Rfou | G06N 3/084 |
| 2021/0081677 | A1* | 3/2021 | Wang | G06T 7/215 |
| 2022/0188654 | A1* | 6/2022 | Knuff | G06N 3/047 |
| 2023/0086327 | A1* | 3/2023 | Song | G06F 16/242 |
| | | | | 382/159 |
| 2023/0090743 | A1* | 3/2023 | Pinto | G06T 7/10 |
| | | | | 382/141 |
| 2023/0334332 | A1* | 10/2023 | Wu | G06V 10/761 |
| 2023/0368510 | A1* | 11/2023 | Chen | G06V 20/70 |

OTHER PUBLICATIONS

Li et al., "Graph Matching Networks for Learning the Similarity of Graph Structured Objects," arXiv:1904.12787v2 [cs.LG] May 12, 2019 (Year: 2019).*

(Continued)

*Primary Examiner* — Soo Shin
(74) *Attorney, Agent, or Firm* — Maginot, Moore & Beck LLP (57) ABSTRACT

A method for training a model for determining graph similarity is disclosed. The method comprises receiving a first graph and a second graph as training inputs, the first graph and the second graph each including nodes connected by edges. The method further comprises applying a model to the first graph and the second graph to determine (i) pairs of aligned nodes between the first graph and the second graph and (ii) a first training loss. The method further comprises generating a first augmented graph by modifying the first graph depending on the pairs of aligned nodes. The method further comprises applying the model to the first graph and the first augmented graph to determine a second training loss. The method further comprises refining the model based on the first training loss and the second training loss.

19 Claims, 9 Drawing Sheets

(56) References Cited

OTHER PUBLICATIONS

You et al., "Graph Contrastive Learning with Augmentations," arXiv:2010.13902v3 [cs.LG] Apr. 3, 2021 (Year: 2021).*

Li, Yujia, et al. "Graph matching networks for learning the similarity of graph structured objects." International conference on machine learning. PMLR, 2019.

You, Yuning, et al. "Graph contrastive learning with augmentations." Advances in Neural Information Processing Systems 33 (2020): 5812-5823.

Bai, Yunsheng, et al. "Simgnn: A neural network approach to fast graph similarity computation." Proceedings of the Twelfth ACM International Conference on Web Search and Data Mining. 2019.

Doan, Khoa D., et al. "Interpretable graph similarity computation via differentiable optimal alignment of node embeddings." Proceedings of the 44th International ACM SIGIR Conference on Research and Development in Information Retrieval. 2021.

Everingham, Mark, et al. "The pascal visual object classes (voc) challenge." International journal of computer vision 88.2 (2010): 303-338.

Liu, He, et al. "Joint graph learning and matching for semantic feature correspondence." arXiv preprint arXiv:2109.00240(2021).

* cited by examiner

| Configuration | Similarity (AUC) | Node Alignment (Acc.) |
|---|---|---|
| Baseline (GMN) | 0.88 | 0.21 |
| GMN with 1-1 Cross Attn | 0.865 | 0.275 |
| MTL with Random Data Aug. | 0.865 | 0.28 |
| MTL with Self-Guided Data Aug. | 0.87 | 0.297 |
| **Node Alignment Supervision | _ | 0.40 |

FIG. 9

BOOSTING GRAPH EXPLAINABILITY USING SELF-GUIDED DATA AUGMENTATION

FIELD

The device and method disclosed in this document relates to machine learning and, more particularly, to boosting graph explainability using self-guided data augmentation.

BACKGROUND

Unless otherwise indicated herein, the materials described in this section are not admitted to be the prior art by inclusion in this section.

Graph data is ubiquitous and employed in a wide range of applications, such as computer science, biology, chemistry, the automobile industry, and more. Many other popular data types such as image data and text data can be converted to graph data, which can improve the performance of the respective models. Graph similarity is a fundamental problem for graphs, in which it is predicted whether a given pair of graphs are similar or dissimilar. Some research has proposed deep learning-based solutions for the graph similarity problem. However, given the black box nature of deep learning, explaining the predictions made using a deep learning-based graph similarity method is important for developers and stakeholders. For this purpose, several explainable graph similarity methods have also been proposed, in which a graph embedding model's reasoning is explained in terms of node alignments between the graphs.

Existing explainable graph similarity methods have shown good performance and qualitative results. However, they are heavily dependent on node features that are rich in semantic knowledge, and often use toy datasets for evaluation of the explainability results which could be limiting for real world graph similarity scenarios.

A common theme among existing explainable graph similarity methods is the use of a component that allows cross-graph information flow such as cross-graph attention or its variations. After training the model, cross-graph attention maps are obtained and studied at inference. However, given the soft nature of attention, this inference can lead to misleading explainability results. Moreover, another challenge for such an analysis is choosing an effective method for doing explainability inference on the cross-attention maps.

SUMMARY

A method for training a model for determining graph similarity is disclosed. The method comprises receiving a first graph and a second graph as training inputs, the first graph and the second graph each including nodes connected by edges. The method further comprises applying a model to the first graph and the second graph to determine (i) pairs of aligned nodes between the first graph and the second graph and (ii) a first training loss. The method further comprises generating a first augmented graph by modifying the first graph depending on the pairs of aligned nodes. The method further comprises applying the model to the first graph and the first augmented graph to determine a second training loss. The method further comprises refining the model based on the first training loss and the second training loss.

A method for determining graph similarity is disclosed. The method comprises receiving a first graph and a second graph as inputs, the first graph and the second graph each including nodes connected by edges. The method further comprises applying a model to the first graph and the second graph to determine (i) pairs of aligned nodes between the first graph and the second graph and (ii) a similarity score indicating a similarity between the first graph and the second graph. The method further comprises using the pairs of aligned nodes and the similarity score to perform a task. Each pair of aligned nodes in the pairs of aligned nodes includes exactly one node from the first graph and one node from the second graph, and each node from the first graph and the second graph is included in no more than one pair of aligned nodes.

BRIEF DESCRIPTION OF THE DRAWINGS

The foregoing aspects and other features of the methods are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

The disclosure relates to a system and method for determining graph similarity in an explainable manner. For a better understanding of the problem of explainability in context of graph similarity, a formal definition of the problem is provided. First, the problem is defined as determining pair-wise graph similarity and, then, the terminology is extended to explainability.

Figure 1:
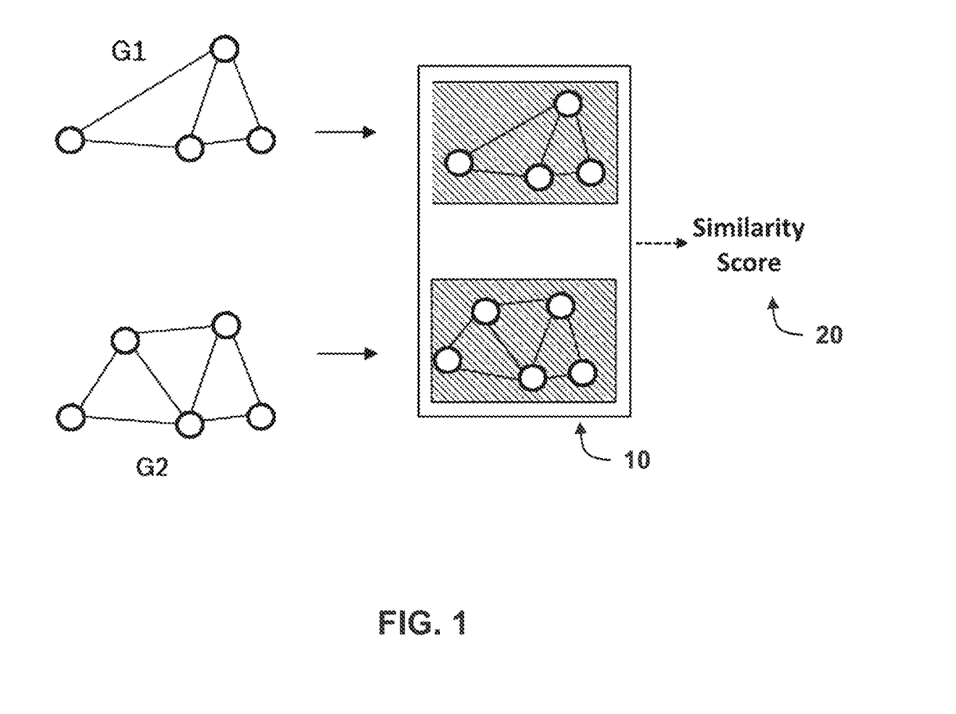
FIG. 1 shows a graph matching network model for performing a graph similarity task.

FIG. 1 shows a graph matching network (GMN) model 10 for performing a graph similarity task. Let G=(V, E) denote an undirected graph where V is the set of vertices and E is the set of edges in the graph G. Given a pair of graphs (G1, G2), the problem of pair-wise graph similarity aims to find a similarity model s(G1, G2), also referred to as a scoring function, such that s(G1, G2) is high when G1 and G2 are similar, and low when G1 and G2 are dissimilar. In the illustrated example, the GMN model 10 implements the similarity model s(G1, G2) and provides a similarity score 20

Given such a graph similarity model s(G1, G2), the problem of explainability aims to explain the graph similarity model's reasoning in terms of node alignments between the pair of graphs. For instance, for the similarity model s(G1, G2), a mapping is found from V1 to V2 that explains the reasoning behind the score, where V1 and V2 are the sets of vertices for the graphs G1 and G2, respectively. Intuitively, if the similarity model predicts high similarity between two graphs, it should learn which nodes in V1 match to which nodes in V2 and vice-versa, as this is an important criterion humans might use for comparing graphs.

For the purpose of greater explainability, the graph similarity method disclosed herein advantageously provides the node alignment information that is used by a model to predict similarity between two graphs. Particularly, the model uses a sparse 1×1 cross-graph attention strategy for aligning nodes between the two graphs. This 1×1 cross-graph attention improves the explanation quality compared to traditional "soft" cross-graph attention and can be used in any model architecture employing cross-graph attention.

This model is trained in a multi-task learning framework setting having two task components: (1) a pair-wise graph similarity task and (2) a self-supervised contrastive learning task. The self-supervised contrastive learning task advantageously leverages data augmentation to provide further improvements in explainability. In particular, the node alignments generated by the model during training are used for self-guided data augmentations in the contrastive learning task.

The graph similarity method and multi-task learning framework described herein significantly higher explainability performance compared to the existing cross-graph attention-based approaches. Particularly, experimental results using a popular graph matching dataset PascalVOC show that the 1×1 cross-graph attention learns better node alignments without any significant loss in the graph similarity loss. Additionally, training the model using the multi-task learning framework provides further node alignments improvements, owing to the self-guided data augmentation.

Exemplary Hardware Embodiment

Figure 2:
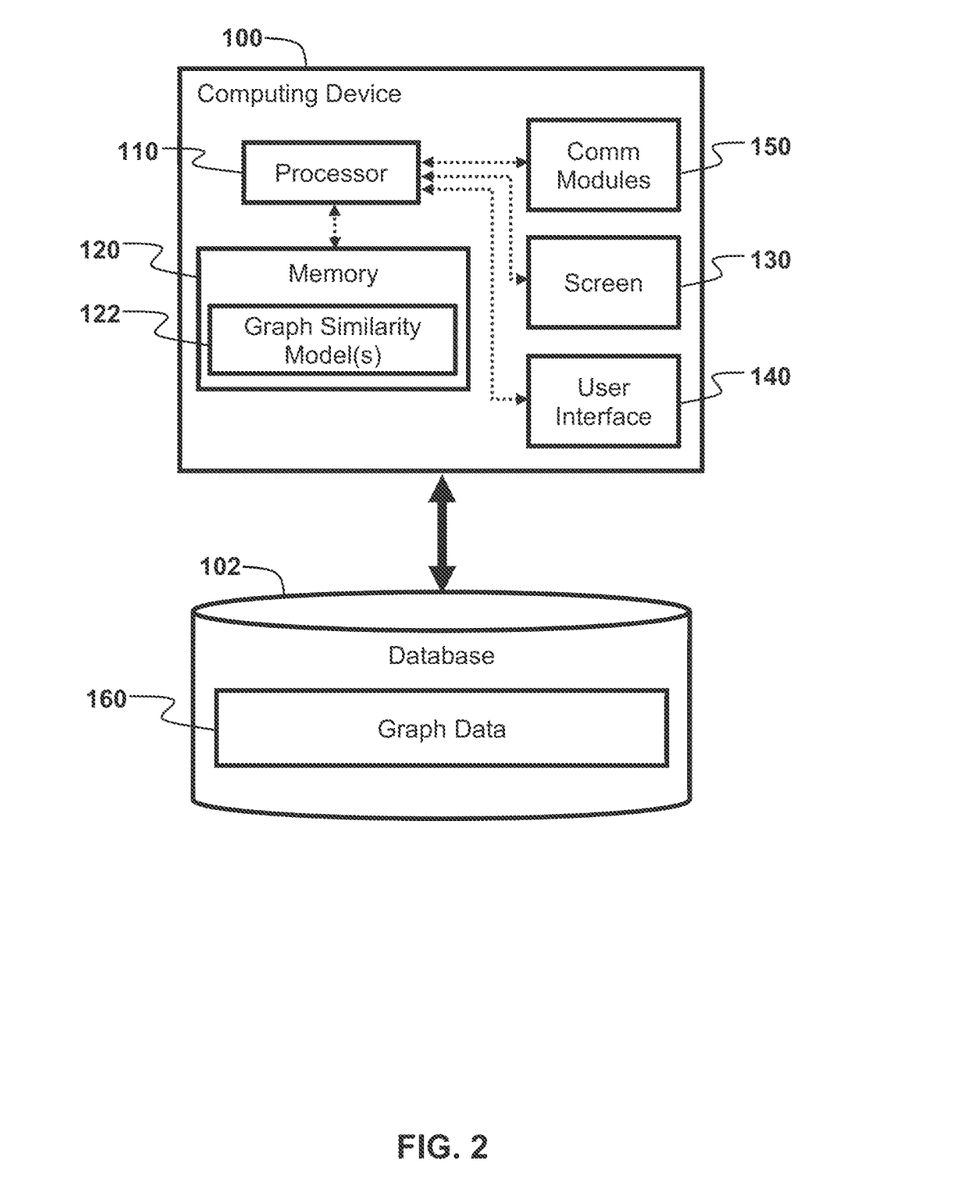
FIG. 2 shows an exemplary embodiment of the computing device that can be used to train or operate a graph similarity model.

FIG. 2 shows an exemplary embodiment of the computing device 100 that can be used to train a graph similarity model 122 for determining a similarity between graphs in an explainable manner. Likewise, the computing device 100 may be used to operate a previously trained graph similarity model 122 to determine a similarity between graphs for some practical purpose and provide node alignment information for greater explainability. The computing device 100 comprises a processor 110, a memory 120, a display screen 130, a user interface 140, and at least one network communications module 150. It will be appreciated that the illustrated embodiment of the computing device 100 is only one exemplary embodiment is merely representative of any of various manners or configurations of a server, a desktop computer, a laptop computer, mobile phone, tablet computer, or any other computing devices that are operative in the manner set forth herein. In at some embodiments, the computing device 100 is in communication with a database 102, which may be hosted by another device or which is stored in the memory 120 of the computing device 100 itself.

The processor 110 is configured to execute instructions to operate the computing device 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the computing device 100 to perform various operations described herein. The memory 120 may be of any type of device capable of storing information accessible by the processor 110, such as a memory card, ROM, RAM, hard drives, discs, flash memory, or any of various other computer-readable medium serving as data storage devices, as will be recognized by those of ordinary skill in the art.

The display screen 130 may comprise any of various known types of displays, such as LCD or OLED screens, configured to display graphical user interfaces. The user interface 140 may include a variety of interfaces for operating the computing device 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes an ethernet adaptor or a Wi-Fi® module configured to enable communication with a wired or wireless network and/or router (not shown) configured to enable communication with various other devices. Additionally, the network communications module 150 may include a Bluetooth® module (not shown), as well as one or more cellular modems configured to communicate with wireless telephony networks.

In at least some embodiments, the memory 120 stores program instructions of the graph similarity model(s) 122 that, once the training is performed, are configured to determine a similarity between graphs in an explainable manner. In at least some embodiments, the database 102 stores a plurality of graph data 160, which includes a plurality of training graphs that are labeled with plurality of similarity labels, each describing the similarity of pairs of graphs in the plurality of training graph.

Method of Training a Graph Similarity Model

A variety of operations and processes are described below for operating the computing device 100 to develop and train the graph similarity model 122 for determining a similarity between graphs in an explainable manner. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 or of the database 102 to perform the task or function. Additionally, the steps of the methods may be performed in any feasible chronological order, regardless of the order shown in the figures or the order in which the steps are described.

Figure 3:
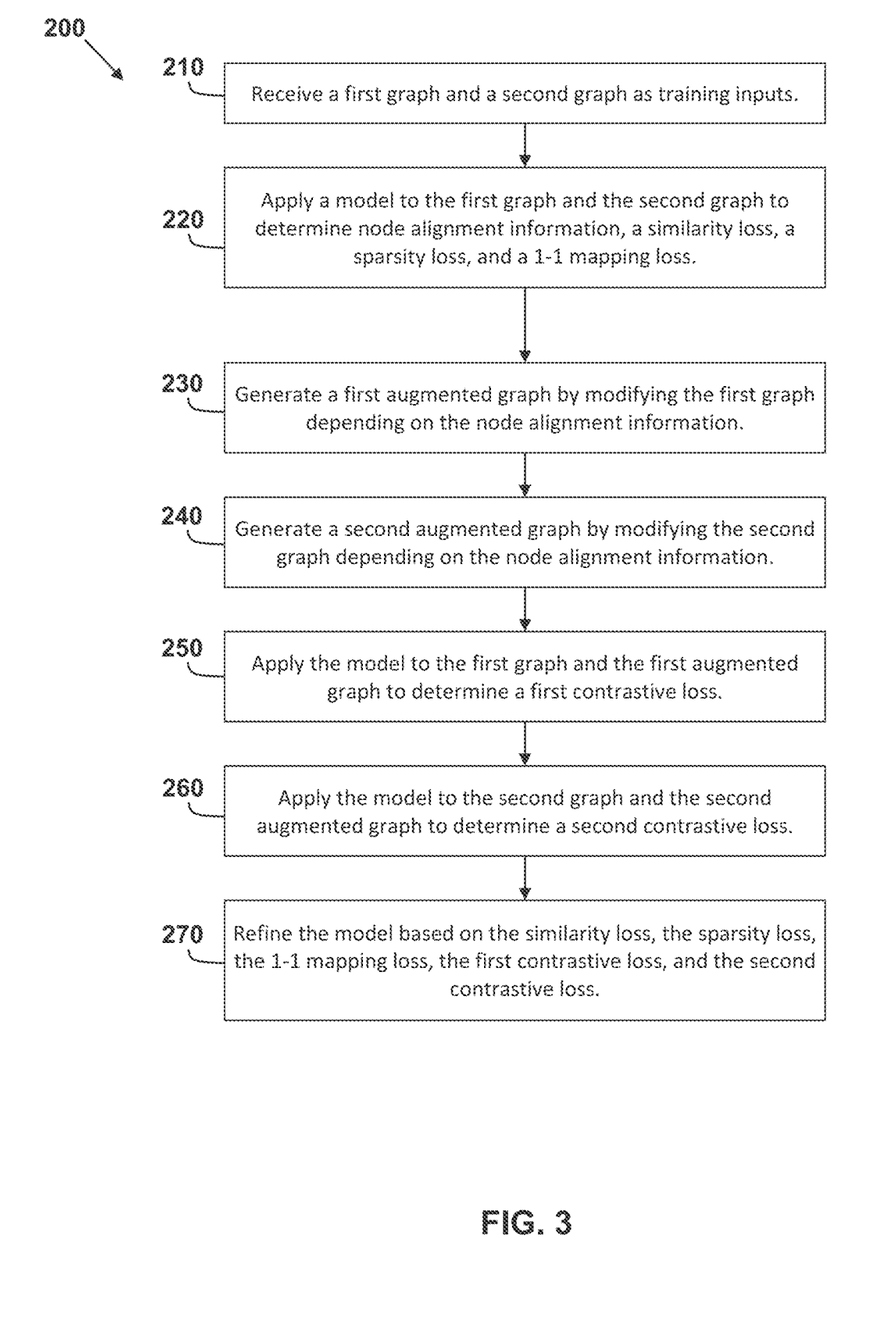
FIG. 3 shows a flow diagram for a method 200 for training a graph similarity model configured to determine a similarity between graphs.

FIG. 3 shows a flow diagram for a method 200 for training a graph similarity model configured to determine a similarity between graphs. The method 200 advantageously adopts a learning framework that includes a several features that improve upon conventional graph similarity models and learning frameworks. Firstly, the graph similarity model 122 utilizes a 1×1 cross-graph attention to identify 1×1 node alignments. The determination 1×1 node alignments between two graphs greatly enhances the explainability of the similarity determination made by the graph similarity model 122. Secondly, the learning framework advantageously trains the graph similarity model in a multi-task learning fashion on two complementary tasks: (1) a pairwise graph similarity task and (2) a data-augmentation based contrastive learning task. The graph similarity model advantageously trained to perform both these complementary tasks together. The tasks are complementary in nature and affect each other's training signals. The two tasks are considered complementary because they have the same high-level goal: predicting whether two given graphs are similar or not by exploiting their structure. Finally, the data augmentation that is leveraged by the learning framework advantageously utilizes the 1×1 node alignments to guide the data augmentation process.

Figure 4:
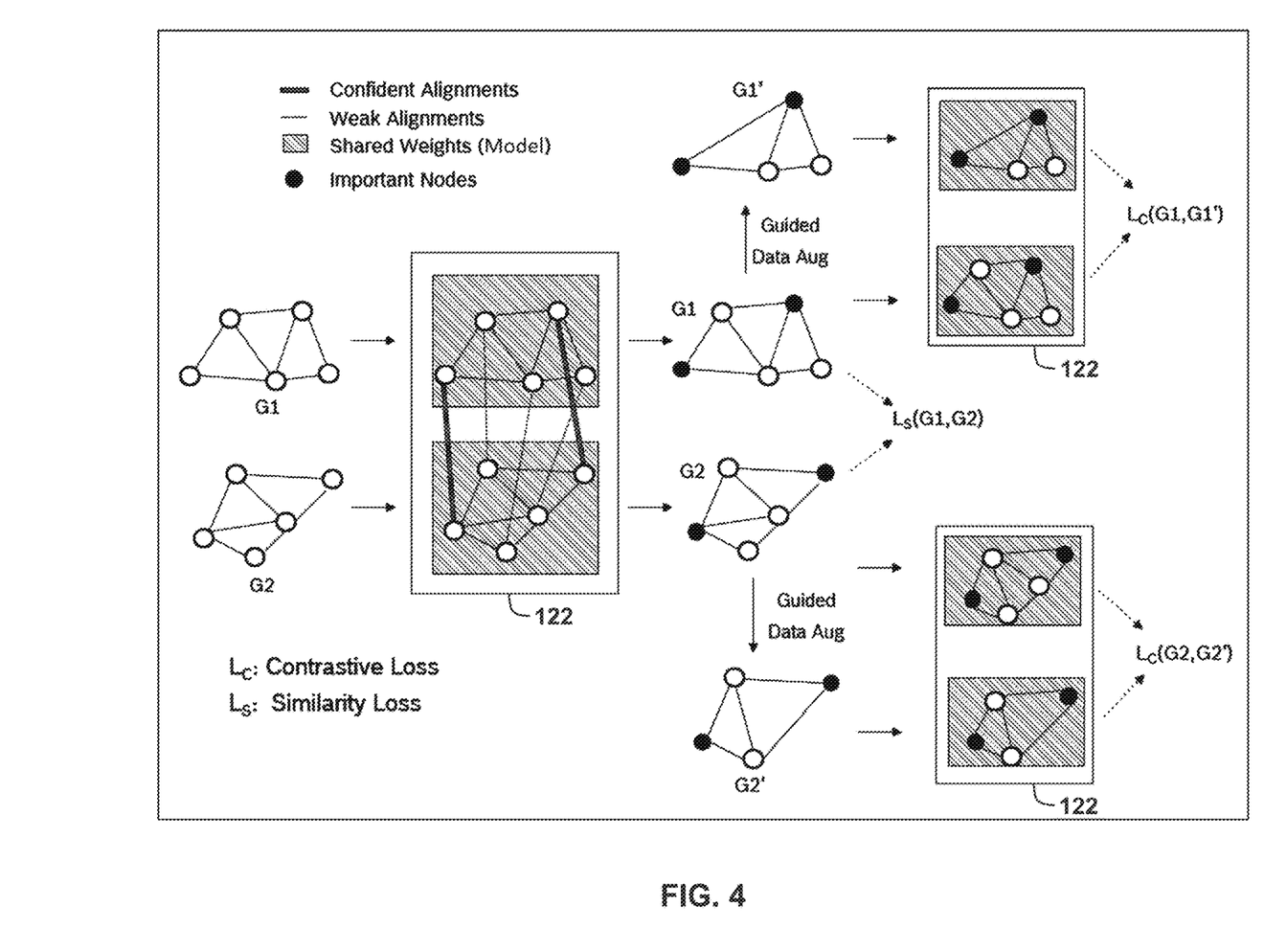
FIG. 4 shows a schematic diagram of a learning framework utilized by the computing device to train given graph similarity model.

The method 200 begins with receiving a first graph and a second graph as training inputs (block 210). Particularly, the processor 110 receives and/or the database 102 stores a plurality of training graphs (i.e., the graph data 160). Each training graph G=(V, E) comprises a set of vertices V and set of edges E. FIG. 4 shows a schematic diagram of a learning framework utilized by the computing device 100 to train given graph similarity model 122. In the illustrated example, each training iteration begins with receiving a first graph G1 and a second graph G2 as training inputs Additionally, the processor 110 receives and/or the database 102 stores a plurality of similarity labels describing the similarity of pairs of graphs in the plurality of training graphs. In some embodiments, the similarity labels each indicate, in a binary manner, whether a particular pairing of two graphs are similar (a positive label) or dissimilar (a negative label). Alternatively, in other embodiments, the similarity labels may indicate relative similarity between triplets of graphs (i.e., indicating which of a first and second graph, a third graph is more similar to).

In an exemplary embodiment, the processor 110 operates the display 130 to display a graphic user interface (e.g., a data-uploading interface) that enables the user to upload training graph data (e.g., by uploading a file that contains all the training graph data) together with the corresponding ground-truth similarity labels.

Returning to FIG. 3, the method 200 continues with applying a model to the first graph and the second graph to determine node alignment information, a similarity loss, a sparsity loss, and a 1-1 mapping loss (block 220). Particularly, with reference to FIG. 4, the processor 110 executes the graph similarity model 122 with the first graph G1 and the second graph G2 as inputs to determine (1) a set of 1×1 node alignments between the graphs G1 and G2, (2) pairwise similarity loss $L_s$ (G1, G2), (3) a sparsity loss $L_{sparse}$, and (4) a 1-1 mapping loss $L_{1-1}$.

As used herein, "1×1" node alignments means that each pair of aligned nodes includes exactly one node from the first graph G1 and exactly one node from the second graph G2 and that each node in the first graph G1 and the second graph G2 is included in no more than one pair of aligned nodes. In at least some embodiments, the set of 1×1 node alignments not only identify 1×1 pairings of node between the graphs, but also provide respective scores indicating a level of similarity (attention scores) between the nodes in each respective pairing of nodes.

The graph similarity model 122 may take many forms. In some embodiments, the graph similarity model 122 takes the form of a graph neural network (GNN), a graph embedding network, or a graph matching network (GMN). In some embodiments, the graph similarity model 122 may comprise one or more node representation encoders configured to encode the nodes V of the graphs G1 and G2 as node vector embeddings $h_i$, were i is an index corresponding to a respective node in the graphs G1 and G2. Additionally, the graph similarity model 122 may comprise one or more edge representation encoders configured to encode the edges E of the graphs G1 and G2 as edge vector embeddings $e_{ij}$, were i and j are indices corresponding to the nodes connected by the respective edge in the graphs G1 and G2. Finally, the graph similarity model 122 may comprise one or more graph representation encoders configured to generate graph vector embeddings $h_{G1}$ and $h_{G2}$ representing the graphs G1 and G2, respectively. A similarity between the graphs can be determined based on the graph vector embeddings $h_{G1}$ and $h_{G2}$ using a similarity metric such as Euclidean, cosine, or Hamming distance.

The graph representation encoders of the graph similarity model 122 may be configured to generate the graph vector embeddings $h_{G1}$ and $h_{G2}$ based on the node vector embeddings $h_i$ and the edge vector embeddings $e_{ij}$. In some embodiments, the graph representation encoders incorporate a plurality of propagation layers that map sets of node vector embeddings to new node vector embeddings, and an aggregator that, after a several rounds of propagation through the propagation layers, computes the graph vector embeddings $h_{G1}$ and $h_{G2}$ based on a set of node representations. However, a variety of other techniques can be utilized to encode the graph vector embeddings $h_{G1}$ and $h_{G2}$.

Some existing graph similarity models incorporate a matching module or matching function that communicates cross-graph information using cross-graph attention. One example of such a graph similarity model leveraging cross-graph attention is the graph matching network described in the publication "*Graph Matching Networks for Learning the Similarity of Graph Structured Objects*" by Yujia Li et. al, International Conference on Machine Learning. PMLR, 2019 (hereinafter "Li"). In particular, the graph similarity model of Li adopts a cross-graph attention mechanism and operates on soft attention scores, where a node in G1 attends to multiple nodes in G2, and the relationship and/or alignment between the nodes is inferred from the learned attention weights.

However, soft attention scores are not readily usable to explain the predictions made by the model. Accordingly, in some cases, a secondary step of mapping one node in a graph to only one node in the other graph might be performed for the purpose of explaining of the predictions made by the model. This matching may, for example, be performed by using a max operation or an optimization method such as Hungarian matching. The problem with this approach is that there is a disconnect between how attention is used training process and how attention is used at inference and/or explanation of the inference.

In contrast, the graph similarity model 122 according to the disclosure incorporates a matching module or matching function that communicates cross-graph information using a modified version of cross attention referred to herein as "1×1 cross-graph attention." Unlike traditional cross-graph attention, which produces soft attention scores, 1×1 cross-graph attention has the property that for a given graph pair (G1, G2), each node in G1 attends to only one node in G2, and no two nodes in in G1 attend to the same node in in G2. In principle, any graph similarity model that receives two graphs and determines a similarity between the two graphs using traditional cross-graph attention can be modified according to the disclosure to incorporate the 1×1 cross-graph attention mechanism.

Figure 5:
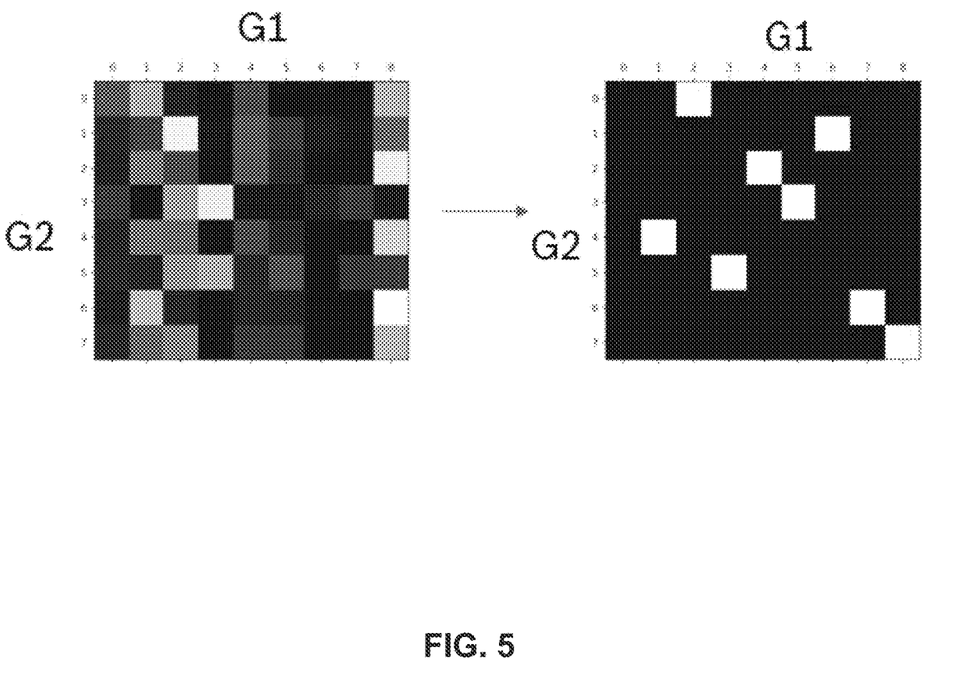
FIG. 5 illustrates a concrete example of 1×1 cross-graph attention matrix.

In general, any graph similarity model 122 that incorporates the 1×1 cross-graph attention mechanism will provide, as an intermediate output, a 1×1 cross-graph attention matrix. The processor 110 determines the 1×1 cross-graph attention matrix based on the node vector embeddings $h_i$ and the edge vector embeddings $e_{ij}$. Based on 1×1 cross-graph attention matrix, the processor 110 determines the set of 1×1 node alignments between the graphs G1 and G2. Since each node in G1 attends to only one node in G2, 1×1 mappings between nodes in the graphs G1 and G2 are easily extracted from the 1×1 cross-graph attention matrix, for example, by applying a $\max_{row}$ operation on the 1×1 cross-graph attention matrix. Additionally, the 1×1 cross-graph attention matrix includes attention scores indicating a level of similarity between the nodes in each 1-1 pair of nodes in the set of 1×1 node alignments FIG. 5 illustrates a concrete example of 1×1 cross-graph attention matrix. On the left, an attention matrix is shown with soft cross-graph attention where a node in graph G1 attends to multiple nodes in graph G2. On the right, an attention matrix is shown with 1×1 cross-graph attention. As can be seen on the right, each node in graph G1 attends to only one node in G2, and no two nodes in G1 attend to the same node in G2. Each value of the 1×1 cross-graph attention matrix is an attention score indicating a level of similarity between the respective pairing of nodes between the graphs G1 and G2.

To achieve the above-mentioned properties, the 1×1 cross-graph attention is defined as an injective function $f$: $V^1 \to V^2$, where $V^1$ and $V^2$ correspond to the vertex sets for graphs G1 and G2 respectively. Without loss of generality, a cross-graph attention matrix is denoted $M \in \mathbb{R}^{N \times N}$ The training of the graph similarity model 122 is guided to achieve 1×1 cross-graph attention using a pair of loss functions that act as constraints on the cross-graph attention matrix M provided by the graph similarity model 122. These loss functions are referred to herein as sparsity loss $L_{sparse}$ and 1-1 mapping loss $L_{1-1}$.

The processor 110 determines the sparsity loss $L_{sparse}$ based on the 1×1 cross-graph attention matrix M and/or based on set of 1×1 node alignments. In one embodiment, the processor 110 determines the sparsity loss $L_{sparse}$ (M) according to the formula—$\Sigma \log (\max_{row}(M))$, where $\max_{row}$ is the row-wise max operation that takes a maximum value along each row of the 1×1 cross-graph attention matrix M. The sparsity loss $L_{sparse}$ term forces each node in graph G1 to attend to (or to be paired with) only one node in graph G2.

The processor 110 determines the 1-1 mapping loss $L_{1-1}$ based on the 1×1 cross-graph attention matrix M and/or based on set of 1×1 node alignments. In one embodiment, the processor 110 determines the 1-1 mapping loss $L_{1-1}(M)$ according to the formula $(sum_{col}(M) - \lambda)^2$, where $sum_{col}$ is a column-wise sum operation that takes a sum of all elements in the columns of the 1×1 cross-graph attention matrix M, and $\lambda$ is set to 1. The 1-1 mapping loss $L_{1-1}$ forces each node in G2 to attend to (or to be paired with) at most one node in G1. In other words, no two nodes in G1 map to the same node in G2

Finally, the processor 110 determines the pairwise similarity loss $L_s$ (G1, G2) based on the graph vector embeddings $h_{G1}$ and $h_{G2}$ and based on the pairwise similarity label for the pairing of graphs G1 and G2. The pairwise similarity loss $L_s$ is a margin-based loss function, where the difference of scores between positive and negative pairs should not be less that the margin. In one embodiment, the processor 110 determines the pairwise similarity loss $L_s$ (G1, G2) according to the formula:

$$L_s(G1, G2) = \mathbb{E}_{(G1,G2,t)}[\max\{0, \gamma - t(1 - d(h_{G1}, h_{G2}))\}],$$

where $t \in \{-1, 1\}$ is a similarity label for the graph pair (G1, G2), $\gamma > 0$ is a margin parameter, and $d(G1, G2)$ is a Euclidean distance between the graph vector embeddings $h_{G1}$ and $h_{G2}$ of the graphs G1 and G2.

The method 200 continues with generating a first augmented graph by modifying the first graph depending on the node alignment information (block 230). Particularly, the processor 110 generates a first augmented graph G1' based on the first graph G1 depending on the set of 1×1 node alignments and/or the 1×1 cross-graph attention matrix M. More particularly, the processor 110 generates the first augmented graph G1' by modifying at least one node in the first graph G1.

For the purpose of data augmentation, the learning framework of the disclosure adopts a task-specific strategy for sampling candidate nodes to be modified. A challenge with data augmentations is that the random augmentations could hurt the structural information in the graph data. Thus, to overcome this challenge, the processor 110 instead utilizes a "self-guided data augmentation" approach to identify candidate nodes in the first graph G1 to be modified. In particular, the processor 110 identifies candidate nodes in the first graph G1 to be modified guided by the previously determined set of 1×1 node alignments between the graphs G1 and G2.

In some embodiments, the processor 110 identifies strongly aligned or important nodes based on the set of 1×1 node alignments and selects candidate nodes in the first graph G1 to be modified that are not among the identified strongly aligned or important nodes. Particularly, the processor 110 identifies a subset of the 1×1 node alignments between the graphs G1 and G2 as being strongly aligned or important nodes. In one example, the processor 110 identifies 1×1 node alignments having an attention score greater than 0.99 (as indicated in the 1×1 cross-graph attention matrix M) as being strongly aligned or important nodes. In another example, the processor 110 identifies a predetermined percentage of the 1×1 node alignments having the highest attention scores as being strongly aligned or important nodes (e.g., top 20% of attention scores). Thus, the processor 110 selects candidate nodes in the first graph G1 to be modified that have attention scores less than a predetermined threshold or that are not within a predetermined top percentage.

In some embodiments, the processor 110 generates the first augmented graph G1' by deleting at least one node from the first graph G1. The processor 110 identifies a candidate node for deletion that as a random one of the nodes that is not a strongly aligned or important nodes in the 1×1 node alignments. In one embodiment, the processor 110 deletes a predetermined percentage of the nodes from the graph G1 to arrive at the first augmented graph G1'. The idea behind using node deletion is to exploit that fact that deleting nodes (20% nodes) from a graph does not change its semantic class. For example, a graph belonging to the class bicycle remains a bicycle even after deleting a random node. In this way, data augmentations are performed while minimizing the loss of important structural information.

Figure 6:
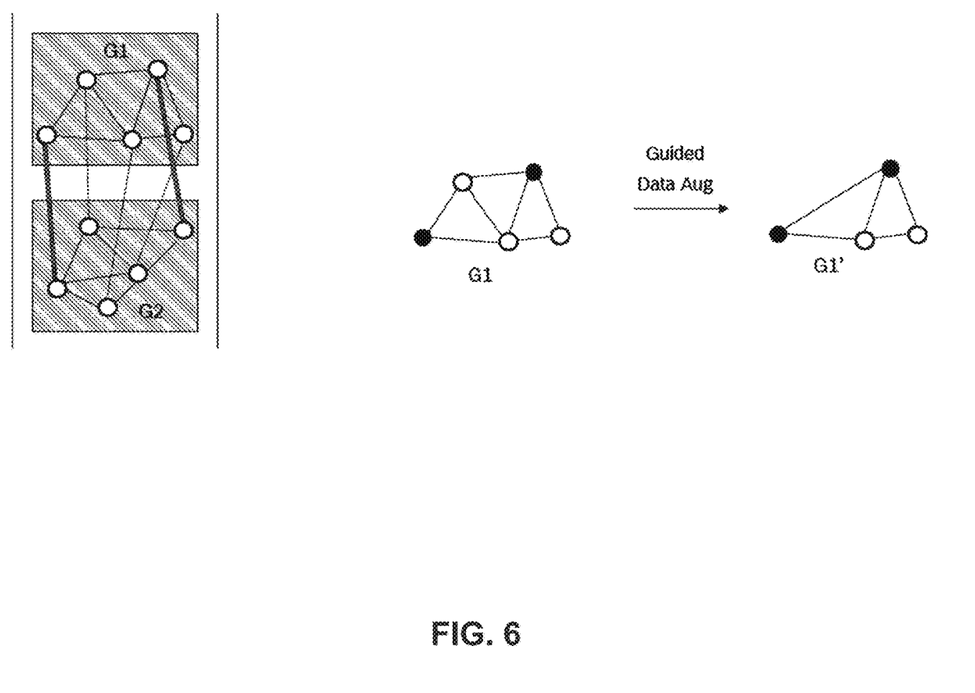
FIG. 6 shows an example of a guided data augmentation.

FIG. 6 shows an example of the guided data augmentation. On left, the 1×1 cross-graph attention learns that the alignment between important nodes (attention score >=0.99, shown as black nodes) is important for the similarity prediction. The data augmentation process keeps these important nodes intact and make random augmentations to the remaining nodes. The right, an augmented graph that was modified by node deletion is shown. With reference again to FIG. 4, the top-right and bottom-left nodes of the first graph G1 are identified as important nodes, indicated as black nodes in the graph G1 after the initial processing by the graph similarity model 122. The first augmented graph G1' is generated by deleting the top-left node from the first graph G1.

Returning to FIG. 2, the method 200 continues with generating a second augmented graph by modifying the second graph depending on the node alignment information (block 240). Particularly, the processor 110 generates a second augmented graph G2' using the second graph G2. The processor 110 generates the second augmented graph G2' essentially the same manner discussed above with respect to generating the first augmented graph G1'. With reference again to FIG. 4, the top-right and bottom-left nodes of the second graph G2 are identified as important nodes, indicated as black nodes in the graph G2 after the initial processing by the graph similarity model 122. The second augmented graph G2' is generated by deleting the middle-right node from the second graph G2

The method 200 continues with applying the model to the first graph and the first augmented graph to determine a first contrastive loss (block 250). Particularly, with reference to FIG. 4, the processor 110 executes the graph similarity model 122 with the first graph G1 and the first augmented graph G1' as inputs to determine a first contrastive loss $L_c(G1, G1')$. In the same manner as discussed above with respect to block 220, the processor 110 applies the graph similarity model 122 to generate graph vector embeddings $h_{G1}$ and $h_{G1}'$. The processor 110 determines first contrastive loss $L_c(G1, G1')$ based on the graph vector embeddings $h_{G1}$ and $h_{G1}'$. The contrastive loss L is a margin-based loss function, where the difference of scores between positive and negative pairs should not be less that the margin, and may adopt precisely the same formulation as the pairwise similarity loss $L_s$. Particularly, in one embodiment, the processor 110 determines the first contrastive loss $L_c(G1, G1')$ according to the formula:

$$L_c(G1, G1) = \mathbb{E}_{(G1,G1',t)}[\max\{0, \gamma - t(1 - d(G1, G1'))\}],$$

where $t_\in\{-1, 1\}$ is a similarity label for the graph pair (G1, G1'), y>0 is a margin parameter, and d(G1, G1') is a Euclidean distance between the graph vector embeddings $h_{G1}$ and $h_{G1}'$ of the graphs G1 and G1'. This formulation is essentially similar to that of $L_s$, with different input graphs.

However, it should be appreciated that a similarity label for the graph pair (G1, G1') does not exist in the graph data 160. Instead, because the first augmented graph G1' was generated by deleting or otherwise modifying an unimportant node of the graph G1, a positive similarity label is presumed (i.e., indicating that the first graph G1 and the first augmented graph G1' are similar).

The method 200 continues with applying the model to the second graph and the second augmented graph to determine a second contrastive loss (block 260). Particularly, with reference to FIG. 4, the processor 110 executes the graph similarity model 122 with the second graph G2 and the second augmented graph G2' as inputs to determine a second contrastive loss $L_c(G2, G2')$, in essentially the same manner discussed above with respect to block 250.

The method 200 continues with refining the model based on the similarity loss, the sparsity loss, the 1-1 mapping loss, the first contrastive loss, and the second contrastive loss (block 270). Particularly, during each training cycle, the processor 110 refines the graph similarity model 122 based on the pairwise similarity loss $L_s$ (G1, G2), the sparsity loss $L_{sparse}$, the 1-1 mapping loss $L_{1-1}$, the first contrastive loss $L_c(G1, G1')$, and the second contrastive loss $L_c(G2, G2')$. In at least some embodiments, the processor 110 determines a weighted summation of the pairwise similarity loss $L_s$ (G1, G2), the sparsity loss $L_{sparse}$, the 1-1 mapping loss $L_{1-1}$, the first contrastive loss $L_c(G1, G1')$, and the second contrastive loss $L_c(G2, G2')$. The weights of the summation are adjustable hyperparameters of the training process. In at least some embodiments, during such the refinement process, the model parameters (e.g., model coefficients, machine learning model weights, etc.) of the graph similarity model 122 are modified or updated based on the losses and/or the weighted summation of the losses (e.g., using stochastic gradient descent or the like).

Once the model is trained, to obtain the final node alignments at inference, the $\max_{row}$ operation is applied on the attention matrix. In one embodiment, the attention matrix is used for the final GNN layer of the graph similarity model 122. Note that, since the $\max_{row}$ operation is used both during training and for obtaining node alignments, this approach avoids the disconnect issue discussed before between training and inference.

Method of Determining a Graph Similarity

A variety of operations and processes are described below for operating the computing device 100 to operate a previously trained graph similarity model 122 to determine a similarity between graphs for some practical purpose and provide node alignment information for greater explainability. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 or of the database 102 to perform the task or function. Additionally, the steps of the methods may be performed in any feasible chronological order, regardless of the order shown in the figures or the order in which the steps are described.

Figure 7:
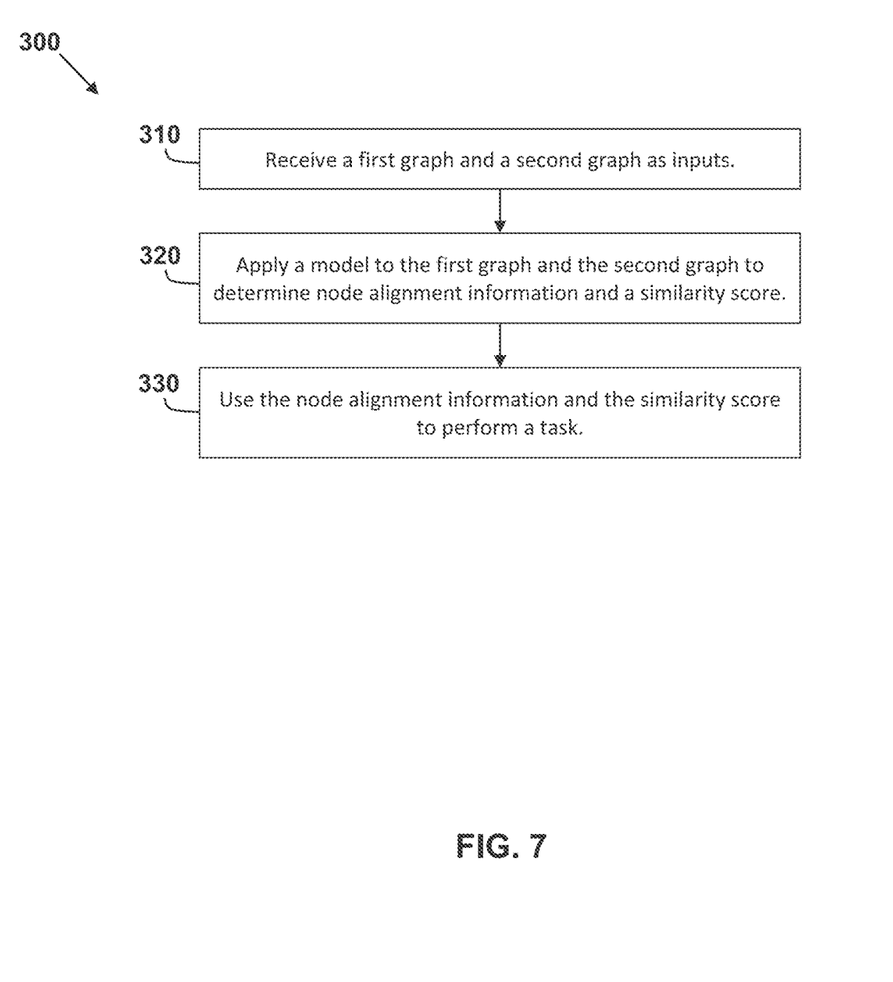
FIG. 7 shows a flow diagram for a method for determining a similarity between graphs.

FIG. 7 shows a flow diagram for a method 300 for determining a similarity between graphs. In particular, once the graph similarity model 122 is trained in the manner discussed above, the graph similarity model 122 can be used to determine a similarity between two graphs in an explainable manner, with improved performance. Although the method 300 for determining a similarity between graphs is described with respect to the computing device 100 that was used to train the graph similarity model 122, it should be appreciated that, once trained, the graph similarity model 122 may be utilized by any number of other computing devices that are not the same device used to train the graph similarity model 122.

The method 300 begins with receiving a first graph and a second graph as inputs (block 310). Particularly, the processor 110 receives a pair of training graphs, e.g., a first graph G1 and a second graph G2. In an exemplary embodiment, the processor 110 operates the display 130 to display a graphic user interface (e.g., a data-uploading interface) that enables the user to upload graph data for similarity determination. In other embodiments, the processor 110 simply receives the graphs G1 and G2 as a part of some larger software application that leverages the trained graph similarity model 122 to determine graph similarity. It should, of course, be appreciated by those of skill in the art that determining graph similar has a wide variety of practical purposes and applications.

In some embodiments, the trained graph similarity model 122 is used in the context of a database search system. For example, the database may store database records for a plurality of graphs or a plurality of image or text data that is associated with respective graphs. The processor 110 operates the display 130 to display a graphic user interface that enables the user to upload or otherwise input a search query. The search query may, for example, comprise the first graph G1 with respect to which the user would like to retrieve similar graphs. In another example, the search query may comprise image or text data with respect to which the user would like to retrieve similar image or text data. The processor 110 converts the query image or text data into the first graph G1, which represents keypoints of the image data or represents the text data. For the purpose of performing a search for similar graphs and/or similar image or text data, the processor 110 retrieves a second graph G2 from a database for a determination of whether the second graph G2 is similar to the first graph G1.

As one example, the database search system may be a medical image search system. The processor 110 receives a search query from the user including a medical image and generates the first graph G1 based on the medical image. The processor 110 retrieves record from a database of medical images. The processor 110 generates the second graph G2 based on a medical image in the retrieved database record or, if the database record already includes a graph, the processor 110 retrieves the second graph G2 from the database record.

The method 300 continues with applying a model to the first graph and the second graph to determine node alignment information and a similarity score (block 320). Particularly, the processor 110 executes the graph similarity model 122 with the first graph G1 and the second graph G2 to determine (1) a set of 1×1 node alignments between the first graph G1 and the second graph G2 and (2) a similarity score indicating similarity between the first graph G1 and the second graph G2. The processor 110 determines the set of 1×1 node alignments between the first graph G1 and the second graph G2 in the same manner discussed above with respect to the block 220 of the method 200. The processor 110 determines the similarity score based on the graph vector embeddings $h_{G1}$ and $h_{G2}$ using a similarity metric such as Euclidean, cosine, or Hamming distance.

The method 300 continues with using the node alignment information and the similarity score to perform a task (block 330). As discussed above, determining graph similarity has a wide variety of practical purposes and applications. In at least some embodiments, the processor 110 displays or otherwise outputs the similarity score and the set of 1×1 node alignments. In other embodiments, the similarity score and the set of 1×1 node alignments are made available to some larger software application that leverages the trained graph similarity model 122 to determine graph similarity for some practical purpose.

As noted above, in one example, the trained graph similarity model 122 is used in the context of a database search system. In such a use-case, the processor 110 determines whether one or more database records are relevant to the search query based on the determined similarity score of the first graph G1 with respect to a second graph G2 that is associated with each database record. As mentioned above, the database may store database records for a plurality of graphs or a plurality of image or text data that is associated with respective graphs. If the second graph G2 from a particular database record is similar to the first graph G1, then the processor 110 may retrieve that database record and cause data from the record to be displayed to the user on the display 130. In above mentioned example of a medical image search system, the processor 110 identifies and retrieves a database record that is similar or relevant to the search query based on the determined similarity scores.

In addition to displaying data from the retrieved record, in some embodiments, the processor 110 causes a graphical representation of at least a subset of the 1×1 node alignments to be displayed on the display 130. In this way, the user is provided with some explanation of why the model 122 determined the database record and/or the associated second graph G2 was relevant to the search query (i.e., similar to the first graph G1). In above mentioned example of a medical image search system, the processor 110 may, for example, display the 1×1 node alignments overlaid on the medical image. In one embodiment, the processor 110 generates the graphical representation of at least some of the 1×1 node alignments in such a manner as to highlight the pairs of nodes having the highest attention scores, e.g., those greater than a predetermined threshold or those in a top predetermined percentage of attention scores.

Experiment Results

The advantages of (1) the 1×1 cross-graph attention utilized by the graph similarity model 122, (2) the multi-task learning framework used to train the graph similarity model 122, and (3) the self-guided data augmentation used to train the graph similarity model 122, have been demonstrated experimentally. An experimental set up and results are discussed below.

Figure 8:
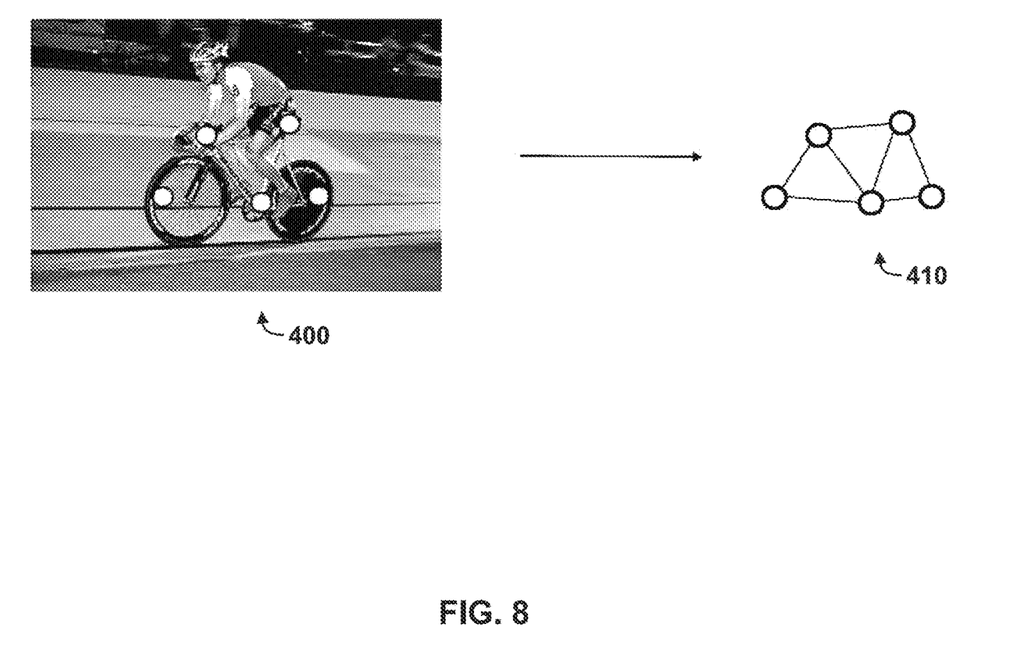
FIG. 8 shows an example of graph generation from an image.

In the experiments, the PascalVOC dataset was used. PascalVOC is a widely used dataset for this problem, which includes images that have each been annotated with keypoints. Delaunay triangulation was applied on the key points to generate graph from this dataset. FIG. 8 shows an example of such graph generation from an image. On the left, an image 400 is shown with a plurality of annotated key points (shown as circles). On the right, a graph 410 is shown, which was generated using Delaunay triangulation.

It should be appreciated that, for the graph similarity task, the image features are not considered. In other words, only the topology and edge lengths of the resultant graph are used for the similarity task, which makes the problem very challenging. This problem becomes much easier when the image features are provided, but the experimental setup shows a more general scenario in which rich node features may not be available.

Figure 9:
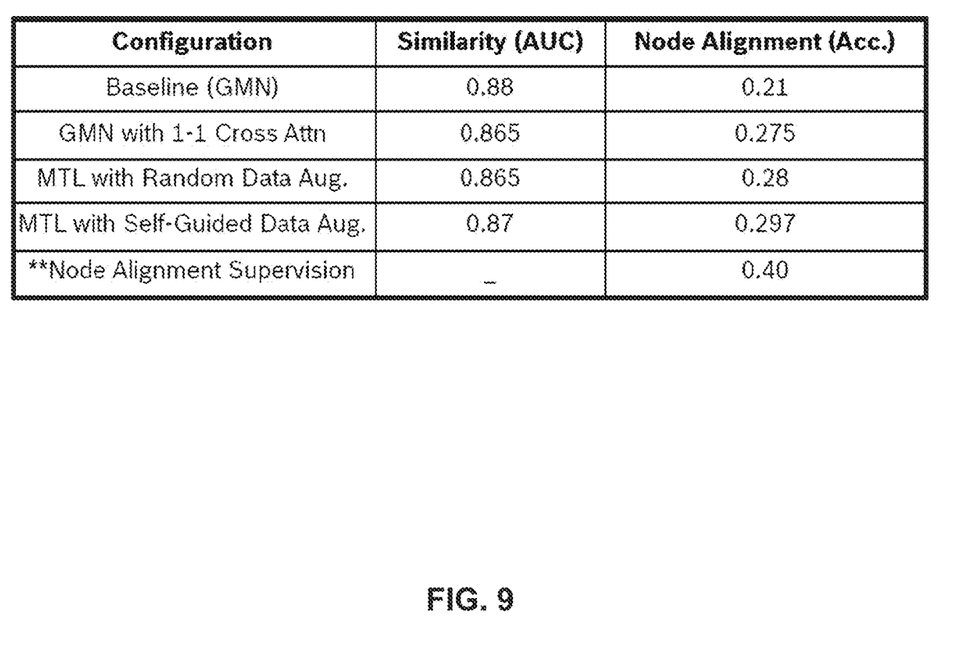
FIG. 9 shows experimental results.

For experimental comparison, the GMN model proposed in Li (mentioned above) was used as a baseline. This model has been shown to provide good node alignment for graph distance-based similarity problem. FIG. 9 shows the results obtained in our experiments. As can be seen, the baseline model solves the similarity problem with an AUC of 0.88, however the node alignment results (0.21) are quite low and only about half of the upper bound, as discussed below. In addition to the to the baseline GMN model, four other model variations were used for comparison and to validate the performance of the models according to the disclosure.

As a first model variation, the GMN model of Li was modified to include the 1×1 cross-graph attention, discussed above. Particularly, the traditional cross-graph attention in the GMN model was replaced in all layers with the 1×1 cross-graph attention, discussed. The purpose of this experiment is to show-case the advantage the 1×1 cross-graph attention mechanism over traditional "soft" cross-graph attention. As can be seen in FIG. 9, by replacing the traditional "soft" cross-graph attention mechanism with the 1×1 cross-graph attention mechanism, the node alignment result (0.275) improves significantly with very minor drop in similarity AUC (0.865). A possible explanation of this drop is that unlike soft cross-graph attention, the 1×1 cross-graph attention provides strong inductive bias on the cross-graph information such that cross-graph information is limited to only 1×1 node alignment. Whereas, in soft attention, the model might learn more nuanced information such as substructure similarity, etc. Overall, the experiments show that the 1×1 cross-graph attention variant learns node alignment much better than the soft cross-graph attention.

As a second model variation, the model was trained using the multi-task learning framework discussed above, but with random data augmentation, rather than the self-guided data augmentation discussed above. As can be seen in FIG. 9, when the baseline GMN model is trained in the multi-task learning framework using random node augmentation, there is a slight improvement on the node alignment accuracy (0.278), with a slight loss in similarity AUC (0.865).

As a third model variation, the model was trained using the multi-task learning framework, with self-guided data augmentation discussed above. As can be seen in FIG. 9, when the multi-task learning framework uses the self-guided data augmentation, both the similarity task performance and the node alignment improve, compared to random data augmentation. Thus, the self-supervision task provides a better learning signal compared to the version that uses random data augmentation.

Comparing results of the baseline GMN model with the first, second, and third model variations, it can be observed that (1) the 1×1 cross-graph attention, (2) the multi-task learning framework, and (3) the self-guided data augmentation each improve the performance of a graph similarity model.

Finally, in an effort to find an upper bound on the node alignment problem, a fourth model variation we used. The model was trained with node alignment ground truth supervision using a cross entropy loss on GMN's cross-graph attention. A can be seen in FIG. 9, even with node alignment supervision, the problem of node alignment on graph skeletons is quite challenging, with an upper bound on the node alignment result at only 0.40.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for training a model for determining graph similarity, the method comprising:
   receiving a first graph and a second graph as training inputs, the first graph and the second graph each including nodes connected by edges;
   applying the model to the first graph and the second graph to determine (i) pairs of aligned nodes between the first graph and the second graph and (ii) a first training loss;
   generating a first augmented graph by modifying the first graph depending on the pairs of aligned nodes, the modifying the first graph including (i) identifying at least one node from the first graph to be deleted depending on attention scores of a cross-graph attention matrix that is determined by the model based on the first graph and the second graph and (ii) deleting the at least one node from the first graph;
   applying the model to the first graph and the first augmented graph to determine a second training loss; and
   refining the model based on the first training loss and the second training loss.

2. The method according to claim 1, wherein each pair of aligned nodes in the pairs of aligned nodes includes exactly one node from the first graph and one node from the second graph, and each node from the first graph and the second graph is included in no more than one pair of aligned nodes.

3. The method according to claim 1, the applying the model to the first graph and the second graph further comprising:
   determining first node vector embeddings representing the nodes of the first graph;
   determining second node vector embeddings representing the nodes of the second graph; and
   determining the pairs of aligned nodes depending on the first node vector embeddings and the second node vector embeddings.

4. The method according to claim 3, the applying the model to the first graph and the second graph further comprising:
   determining a first graph vector embedding representing the first graph based on the first node vector embeddings;
   determining a second graph vector embedding representing the second graph based on the second node vector embeddings; and
   determining the first training loss based on the first graph vector embedding and the second graph vector embedding using a first loss function.

5. The method according to claim 4, the applying the model to the first graph and the second graph further comprising:
   determining first edge vector embeddings representing the edges of the first graph;
   determining second edge vector embeddings representing the edges of the second graph;
   determining the first graph vector embedding depending on the first node vector embeddings and the first edge vector embeddings; and
   determining the second graph vector embedding depending on the second node vector embeddings and the second edge vector embeddings.

6. The method according to claim 4, the applying the model to the first graph and the first augmented graph further comprising:
   determining a third graph vector embedding based on the first graph;
   determining a fourth graph vector embedding based on the first augmented graph; and
   determining the second training loss based on the third graph vector embedding and the fourth graph vector embedding using the first loss function.

7. The method according to claim 3, the applying the model to the first graph and the second graph further comprising:
   determining the cross-graph attention matrix based on the first node vector embeddings and the second node vector embeddings; and
   determining a third training loss based on the cross-graph attention matrix using a second loss function configured to enforce each node in the first graph attending to only one node in the second graph,
   wherein the model is refined based on the third training loss.

8. The method according to claim 3, the applying the model to the first graph and the second graph further comprising:
   determining the cross-graph attention matrix based on the first node vector embeddings and the second node vector embeddings; and
   determining a fourth training loss based on the cross-graph attention matrix using a third loss function configured to enforce each node in the second graph attending to at most one node in the first graph,
   wherein the model is refined based on the fourth training loss.

9. The method according to claim 3, the applying the model to the first graph and the second graph further comprising:
   determining the cross-graph attention matrix based on the first node vector embeddings and the second node vector embeddings; and
   determining the pairs of aligned nodes based on the cross-graph attention matrix.

10. The method according to claim 1, the identifying the at least one node from the first graph to be deleted further comprising:
    identifying the at least one node from the first graph to be deleted as a node of the first graph that is associated with an attention score of the cross-graph attention matrix that does not exceed a predetermined threshold.

11. The method according to claim 1 further comprising:
    generating a second augmented graph by modifying the second graph depending on the pairs of aligned nodes; and
    applying the model to the second graph and the second augmented graph to determine a fifth training loss,
    wherein the model is refined based on the fifth training loss.

12. The method according to claim 1, the refining the model further comprising:
    determining a weight summation of the first training loss and the second training loss.

13. A method for determining graph similarity, the method comprising:
    receiving a first graph and a second graph as inputs, the first graph and the second graph each including nodes connected by edges;
    applying a model to the first graph and the second graph to determine (i) pairs of aligned nodes between the first graph and the second graph and (ii) a similarity score indicating a similarity between the first graph and the second graph; and
    using the pairs of aligned nodes and the similarity score to perform a task,
    wherein each pair of aligned nodes in the pairs of aligned nodes includes exactly one node from the first graph and one node from the second graph, and each node from the first graph and the second graph is included in no more than one pair of aligned nodes.

14. The method according to claim 13, the receiving further comprising:
    receiving a first image;
    determining the first graph based on the first image, the first graph representing keypoints in the first image; and
    retrieve the second graph from a database, the second graph being representing keypoints of a second image in the database.

15. The method according to claim 13, the receiving further comprising:
    receiving first text data;
    determining the first graph based on the first text data, the first graph representing the first text data; and
    retrieve the second graph from a database, the second graph representing second text data in the database.

16. The method according to claim 13, the using the pairs of aligned nodes and the similarity score further comprising:
    retrieving a database record associated with the second graph depending the on the similarity score.

17. The method according to claim 16, the using the pairs of aligned nodes and the similarity score further comprising:

displaying data from the database record; and displaying a graphical representation of at least some of the pairs of aligned nodes.

18. The method according to claim 17, wherein the graphical representation of the at least some of the pairs of aligned nodes is generated so as to highlight pairs of aligned nodes that are associated with attention scores over a predetermined threshold.

19. A method for training a model for determining graph similarity, the method comprising:

receiving a first graph and a second graph as training inputs, the first graph and the second graph each including nodes connected by edges;

applying the model to the first graph and the second graph to determine (i) pairs of aligned nodes between the first graph and the second graph and (ii) a first training loss;

generating a first augmented graph by modifying the first graph depending on the pairs of aligned nodes;

applying the model to the first graph and the first augmented graph to determine a second training loss; and refining the model based on the first training loss and the second training loss, wherein the applying the model to the first graph and the second graph includes (i) determining first node vector embeddings representing the nodes of the first graph, (ii) determining second node vector embeddings representing the nodes of the second graph, (iii) determining a cross-graph attention matrix based on the first node vector embeddings and the second node vector embeddings, wherein the applying the model to the first graph and the second graph includes at least one of (i) determining a third training loss based on the cross-graph attention matrix using a second loss function configured to enforce each node in the first graph attending to only one node in the second graph and (ii) determining a fourth training loss based on the cross-graph attention matrix using a third loss function configured to enforce each node in the second graph attending to at most one node in the first graph, and wherein the refining the model further includes refining the model based on at least one of the third training loss and the fourth training loss.

* * * * *